June 9, 1953 W. E. WITHALL 2,641,462
FRICTION SHOCK ABSORBER FOR RAILWAY CAR TRUCKS
Filed Feb. 23, 1950
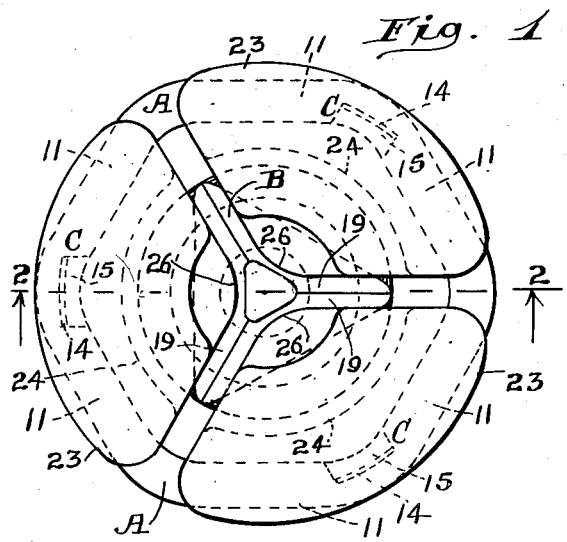
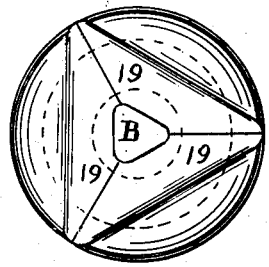
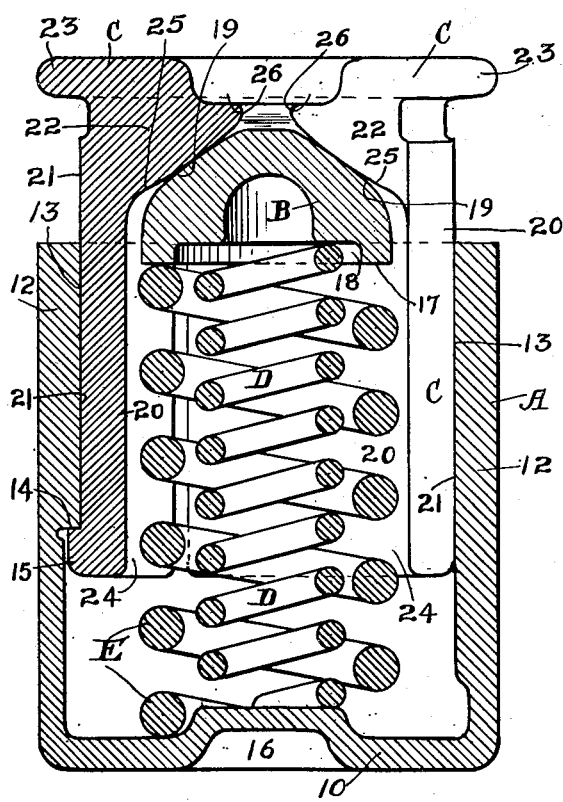
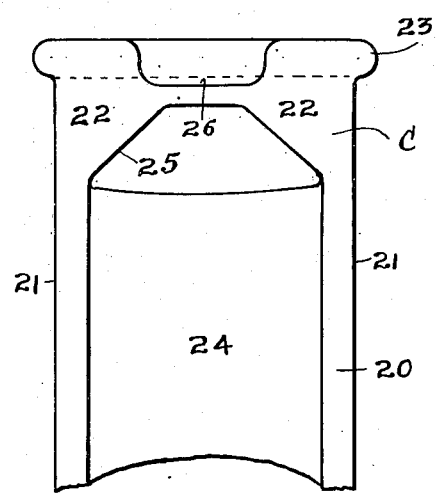
Inventor:
William E. Withall.
By Henry Fuchs
Atty.

Patented June 9, 1953

2,641,462

UNITED STATES PATENT OFFICE 2,641,462

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application February 23, 1950, Serial No. 145,651

2 Claims. (Cl. 267—9)

This invention relates to improvements in friction shock absorbers especially adapted for use in connection with railway car trucks for snubbing the action of the truck springs.

One object of the invention is to provide a friction shock absorber of the character indicated, comprising a friction casing, elongated friction shoes, slidingly telescoped within the casing and adapted to receive the actuating force from the bolster of the truck which bolster acts as a follower, wedge means cooperating with the outer end portions of the shoes for spreading the same apart, retaining lugs on the shoes engaging stop shoulders on the casing, and spring means reacting between the casing and the wedge means for forcing the wedge means into wedging engagement with the shoes and for yieldingly opposing movement of the wedge means and shoes engaged thereby inwardly of the casing, wherein the wedge means and the shoes are provided with cooperating wedge faces which are crowned to provide fulcrum means on which the shoes are rockable to be spread apart at their inner ends with the retaining lugs of the shoes engaged with the stop shoulders of the casing, thus preventing lateral inward tilting of the shoes at said inner end portions, which might otherwise occur and result in failure of the mechanism to operate properly due to binding of the shoes against the friction surfaces of the casing.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a top plan view of the combined wedge and spring follower member of my improved shock absorber. Figure 4 is an inside elevational view, partly broken away, of one of the friction shoes of my improved mechanism.

As shown in the drawing, my improved shock absorber comprises broadly a friction casing A, a combined wedge and spring follower member B, three friction shoes C—C—C, an inner coil spring D, and an outer coil spring E.

The casing A is in the form of a tubular member of hexagonal, horizontal, transverse cross section, open at its top and having a transverse wall 10 at its bottom end. The six walls of the hexagonal casing A are indicated by 11.

At the top end portion of the casing, the side walls are inwardly thickened to provide a friction shell section 12, presenting lengthwise extending, interior friction faces, adjacent of said faces together forming lengthwise extending friction surfaces 13 of V-shaped, transverse cross section. At alternate corners, the casing presents interior, horizontal stop shoulders 14—14—14 with which lugs 15—15—15 on the shoes C—C—C are engageable to limit outward movement of the shoes with respect to the casing A. The bottom wall 10 of the casing A is upwardly offset at the center to provide a hollow boss 16 adapted to accommodate the usual spring centering projection of the bottom spring follower plate of the truck spring cluster of a railway car.

The combined wedge and spring follower member B is in the form of a block having a flat, transverse, bottom face 17 provided with a central seat 18 for the upper end of the spring D. The upper end portion of the block B is provided with three upwardly converging wedge faces 19—19—19, which are rounded or crowned lengthwise, as shown in Figures 2 and 3, that is, each face 19 is of convex contour in lengthwise direction. The three faces 19—19—19 are arranged symmetrically about the central longitudinal axis of the casing and have wedging engagement with the shoes C—C—C.

The friction shoes C are three in number, annularly arranged, and interposed between the combined wedge and spring followed member B and the V-shaped, interior friction surfaces of the casing. Each shoe C comprises a relatively heavy, platelike section 20, having a lengthwise extending, V-shaped friction surface 21 on the outer side engaged with the corresponding V-shaped friction surface 13 of the casing. At the top end thereof, the platelike section 20 of the shoe C has an inward enlargement or head 22 on its inner side and a laterally outwardly projecting flange 23 on its outer side. The flange 23 overhangs the upper end of the casing A and is adapted to shoulder against the latter to limit downward movement of said shoe. On the inner side thereof, the platelike section of the shoe C is cut out to present a transversely curved surface 24. The inner side of the head 22 of each shoe presents a wedge face 25 engaged with the corresponding wedge face 19 of the combined wedge and spring follower member B. The face 25 is rounded, or crowned lengthwise, so as to fulcrum or rock on the wedge face 19. The shoes C—C—C are recessed on their inner sides at the upper ends, as indicated at 26—26—26, to provide a seat for the usual spring centering lug of the top spring follower plate of a cluster of truck springs.

The springs D and E are in the form of helical coils, the spring D being seated on the boss 16 of the casing A and having its top end engaged in the seat 18 of the combined wedge and spring follower member B. The spring E surrounds the spring D and has its top and bottom ends bearing, respectively, on the face 17 of the member B and the wall 10 of the casing A.

My improved shock absorber preferably replaces one or more of the spring units of a truck spring cluster of a railway car, being interposed between the top and bottom spring plates of said cluster.

The operation of my improved shock absorber is as follows: Upon the shoes C—C—C being forced inwardly of the casing A by the bolster, which has a flat bottom face, they are wedged apart by the spring resisted, combined wedge and spring follower member B, thereby providing high frictional resistance to absorb shocks and dampen the action of the truck springs of a railway car. During this spreading action by the member B, as the flat faced bolster exerts pressure on the flat upper ends of the shoes C—C—C, there is, due to the curvature of the faces 25 of the shoes and the corresponding wedge faces 19 of the member B, a tendency of the shoes to fulcrum or rock inwardly, or toward the center of the mechanism, causing the lower ends of the shoes to be spread apart and tightly engage the friction surfaces of the casing, and at the same time prevent inward tilting of said lower ends.

I claim:

1. In a friction shock absorber, the combination with a friction casing; of elongated friction shoes slidingly telescoped within the casing, said shoes having lateral inward enlargements at their outer ends; a combined wedge and spring follower member inwardly of said enlargements, said member and enlargements of said shoes having engaging wedge faces, said engaging wedge faces being rounded lengthwise; and spring means within the casing bearing at its outer end on said combined wedge and spring follower member for yieldingly opposing inward movement of the latter.

2. In a friction shock absorber, the combination with a friction casing; of elongated friction shoes slidingly telescoped within the casing, each shoe having an inwardly facing wedge face at its outer end rounded in lengthwise direction; a combined wedge and spring follower member, said member having outwardly facing wedge faces at its outer end engaged respectively with said wedge faces of the shoes, said wedge faces of said member being crowned in lengthwise direction; and spring means within the casing bearing on said combined wedge and spring follower member for yieldingly opposing inward movement of the latter.

WILLIAM E. WITHALL.

References Cited in the file of this patent

UNITED STATES PATENTS

| Number | Name | Date |
|---|---|---|
| 1,004,498 | Symington | Sept. 26, 1911 |
| 1,223,823 | O'Connor | Apr. 24, 1917 |
| 1,256,297 | Courson | Feb. 12, 1918 |
| 2,171,659 | Lehman | Sept. 5, 1939 |
| 2,456,635 | Heater | Dec. 21, 1948 |
| 2,481,030 | Link | Sept. 6, 1949 |
| 2,570,159 | Schlegel | Oct. 2, 1951 |